United States Patent [19]

Sugiyama

[11] Patent Number: 4,836,608
[45] Date of Patent: Jun. 6, 1989

[54] RECLINING DEVICE OF SEAT

[75] Inventor: Hiroshi Sugiyama, Kanagawa, Japan

[73] Assignee: Ikeda Bussan Co., Ltd., Ayase, Japan

[21] Appl. No.: 139,827

[22] Filed: Dec. 30, 1987

[30] Foreign Application Priority Data

Mar. 12, 1987 [JP] Japan .................................. 62-57286

[51] Int. Cl.[4] .......................... A47C 1/025; B60N 1/06
[52] U.S. Cl. ..................................... 297/367; 297/379
[58] Field of Search ............... 297/367, 369, 379, 366, 297/368

[56] References Cited

U.S. PATENT DOCUMENTS

| | | | |
|---|---|---|---|
| 2,784,770 | 3/1957 | Herr | 297/367 |
| 3,901,100 | 8/1975 | Iida et al. | 297/367 X |
| 3,973,288 | 8/1976 | Pickles | 297/367 X |
| 4,223,947 | 9/1980 | Cremer | 297/367 X |
| 4,457,557 | 7/1984 | Une | 297/367 X |

FOREIGN PATENT DOCUMENTS

| | | | |
|---|---|---|---|
| 3527052 | 1/1987 | Fed. Rep. of Germany | 297/367 |
| 5958 | 10/1986 | PCT Int'l Appl. | 297/367 |
| 1588867 | 4/1981 | United Kingdom | 297/367 |
| 2085959 | 5/1982 | United Kingdom | 297/367 |

Primary Examiner—Peter R. Brown
Attorney, Agent, or Firm—Foley & Lardner, Schwartz, Jeffery, Schwaab, Mack, Blumenthal & Evans

[57] ABSTRACT

Herein disclosed is a reclining device which can keep the latched engagement between a lock lever and a lock plate member even when, due to for example, sudden sitting of a person onto the seat, an abnormally big force is suddenly applied to the lock lever in a direction to cancel the latched engagement with the lock plate member. An operation lever is biased in a direction to cause a leaning end thereof to press a lug of the lock plate in a direction to achieve the latched engagement. The lock plate member, the lock lever and the operation lever are so arranged that when the leading end of the operation lever is pressed against the lug of the lock plate, the top of the leading end is placed at an opposite side of a pivot pin of the lock lever with respect to an imaginary line which passes through both a pivot pin of the lock plate member and a pivot pin of the operation lever.

9 Claims, 1 Drawing Sheet

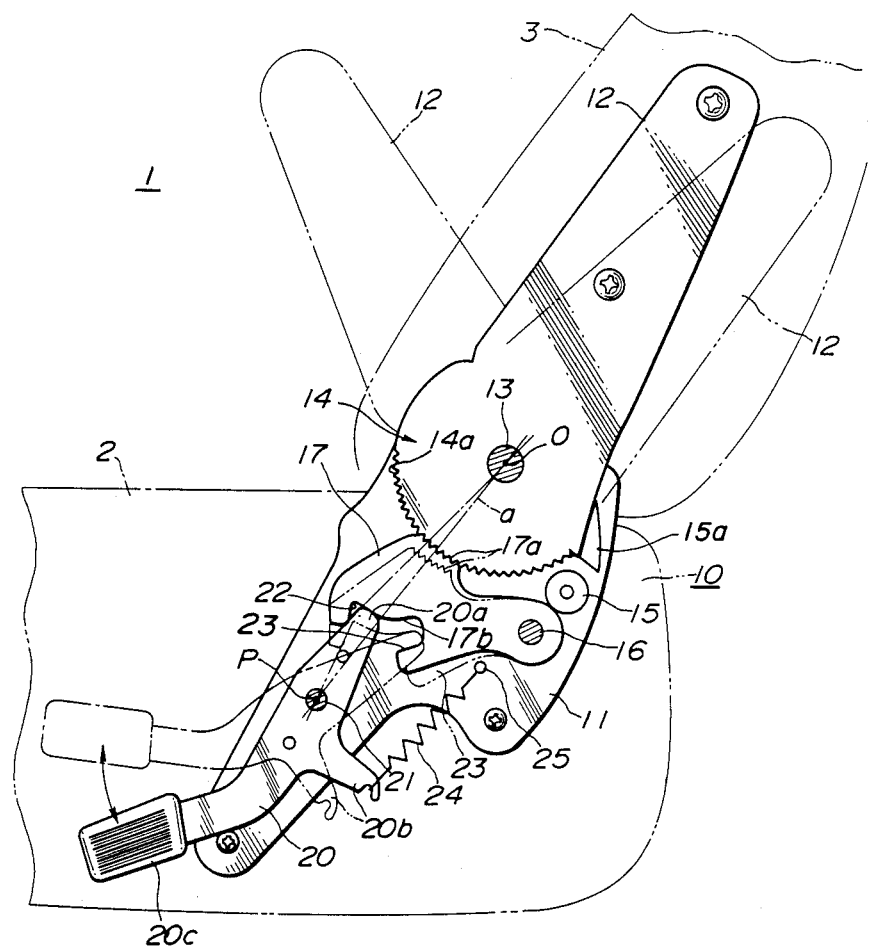

RECLINING DEVICE OF SEAT

BACKGROUND OF THE INVENTION

1. Field of the Invention

The present invention relates to reclining devices for seats, particularly for automotive seats.

2. Description of the Prior Art

Hitherto, various kinds of reclining devices have been proposed and put into practical use particularly in the field of automotive seats. As is known, the reclining device is a device for adjusting the angular position of a seatback relative to a seat cushion to provide a seat occupant with a comfortable sitting posture. Most of the conventional reclining devices are of a type which comprises a toothed lock plate which is mounted to a hinge arm of the seatback, and a pawl-mounted lock lever which is pivotally connected to a base member on the seat cushion, wherein upon position adjustment of the seatback, the pawl of the lock lever is latchingly engaged with one or some of the teeth of the lock plate.

In the reclining device of this type, a fairly strong spring is incorporated with the lock lever in order to assure the latched engagement between the lock lever and the lock plate even when the seat is subjected to a severe treatment. In fact, when, due to sudden sitting of a person on the seat, a marked load is suddenly applied to the seatback, the lock lever is applied with a big force in a direction to break the latched engagement with the lock plate. In order to deal with this undesirable phenomenon, such a strong spring is employed.

However, usage of such a strong biasing spring, in turn, brings about a difficulty in manipulating an actuating handle incorporated with the lock lever. In fact, the manipulation of the handle for the purpose of cancelling the latched engagement between the lock lever and the lock plate should be carried out against a big force produced by the spring.

SUMMARY OF THE INVENTION

It is therefore an object of the present invention to provide a reclining device which is free of the above-mentioned drawback.

According to he present invention, there is provided a reclining device of a seat which has a seat cushion and a seatback. The reclining device comprises a base member secured to the seat cushion; a hinge arm secured to the seatback and pivotally connected to the base member so that the seatback is pivotal relative to the seat cushion; a lock plate member movable with the hinge arm, the lock plate member being formed with a first toothed portion; a lock lever pivotally connected to the base member, the lock lever being formed with a second toothed portion which is latchingly engageable with the first toothed portion of the lock plate member when the lock lever assumes a given angular position; an operation lever pivotally connected to the base member for actuating the lock lever, the operation lever being pivotal between a first position to render the lock lever to achieve a latched engagement with the lock plate member through the first and second toothed portions and a second position to render the lock lever to cancel the latched engagement; first means for biasing the operation lever in a direction to bias the lock lever to achieve the latched engagement with the lock plate member; and second means for assuring the latched engagement between the lock lever and the lock plate member when, with the operation lever assuming the first position, an external force is applied to the lock lever in a direction to separate the lock lever from the lock plate member.

BRIEF DESCRIPTION OF THE DRAWING

Other objects and advantages of the present invention will become apparent from the following description when taken in conjuction with the accompanying single drawing which shows a side view of a reclining device of the present invention.

DETAILED DESCRIPTION OF THE INVENTION

Referring to the single drawing, there is shown a reclining device 10 according to the present invention, which is practically applied to an automotive seat 1. The seat 1 comprises a seat cushion 1 and a seatback 2 which is pivotally mounted on the seat cushion 1 in a manner as will be described hereinafter.

The reclining device 10 comprises base members 11 secured to respective side rear portions of the seat cushion 2 and hinge arms 12 secured to respective side lower portions of the seatback 3. These base members 11 and the hinge arms 12 constitute two laterally spaced identical hinge units across which a pivot shaft 13 extends to allow the seatback 3 to be pivotal relative to the seat cushion 2 about the pivot shaft 13.

One of the hinge units, viz., the unit as illustrated in the drawing, is incorporated with essential parts of the reclining device 10 in the following manner.

That is, a lower peripheral portion of the hinge arm 12 is formed with a plurality of teeth 14a which are arranged to extend coaxial with the pivot shaft 13. For ease of description, the portion where the teeth 14a are formed will be referred to as a lock plate portion 14 hereinafter. A lower right portion of the hinge arm 12 is formed with a projection 15a, and the base member 11 is provided near the projection 15a with a stopper stud 15. When the seatback 3 is inclined backward, the projection 15a of the hinge arm 12 is brought into contact with the stopper stud 15 thereby limiting the backward pivoting of the seatback 3.

A lock lever 17 in the form of a clenched fist is pivotally connected through a pivot pin 16 to the base member 11. The lock lever 17 is formed at its free end upper portion with teeth 17a which are arranged and shaped to be latchingly engageable with the teeth 14a of the lock plate portion 14. Thus, it will be appreciated that upon achieving the latched engagement between the teeth 17a and 14a, the seatback 3 is locked at a certain angular position relative to the seat cushion 2.

For the reasons which will be clarified hereinafter, the free end of the lock lever 17 is formed at its lower side with a recess 17b which leaves at its sides first and second lugs 22 and 23.

Below the lock lever 17, there is arranged an operation lever 20 in the form of character "Y", which is pivotally connected to the base member 11 through a pivot pin 21. The operation lever 20 has a handle section which is equipped with a grip 20c, a first arm section 20a which extends into the recess 17a of the lock lever 17 and a second arm section 20b which is formed with a cut (no numeral). A spring 24 is extended between the cut of the second arm section 20b and a pin 25 secured to the base member 11, so that the operation lever 20 is biased in a counterclockwise direction in the drawing about the pivot pin 21, that is, in a direction to cause the first arm section 20a to push the first lug 22 in a clockwise direction about the pivot pin 16. Thus, usually, due to the force of the spring 24, the lock lever 17 is biased to establish a latched engagement with the lock plate portion 14 through the teeth 17a and 14a. It is to be noted that under this latched condition, a top surface of the leading end of the first arm section 20a is in a slidable contact with a bottom portion of the recess 17b. Thus, preferably, the top surface is curved to be concentric with the pivot pin 21 and the left side of the recess 17b of the lock lever 17 is shaped to coincide with the shape of the top surface. It is also to be that that under the latched condition, the leading end of the first arm section 20a is placed at a left side with respect to an imaginary line "a" which passes through both the axis "P" of the pivot pin 21 and the axis "O" of the pivot pin 13.

The pivotal movement of the operation lever 20 is thus restricted within a given range determined by the engagement of the first arm section 20a with the first and second lugs 22 and 23. If desired, the pivot pin 21 may be replaced with an eccentric cam shaft for achieving a tight or playless latched engagement between the lock lever 17 and the lock plate portion 14.

In the following, operation will be described. For ease of understanding, the description will be commenced with respect to a latched condition of the reclining device as illustrated by solid lines in the drawings.

Under this latched condition, due to the biasing force of the spring 24, the first arm section 20a of the operation lever 20 pushes the first lug 22 of the lock lever 17 outwardly thereby forcing the lock lever 17 to establish a latched engagement with the the lock plate portion 14. Thus, in this condition, the seatback 3 is locked at a given angular position relative to the seat cushion 2.

When now the grip 20c of operation lever 20 is pulled up to turn the same in a clockwise direction about the pivot pin 21 against the biasing force of the spring 24, the first arm section 20a of the operation lever 20 is moved from the first lug 22 of the lock lever 17 to the second lug 23 of the same, as shown by phantom lines in the drawing, and pushes the latter in a counterclockwise direction. Thus, the lock lever 17 is turned counterclockwise separating from the lock plate portion 14. The latched engagement between the lock lever 17 and the lock plate portion 14 is thus cancelled. Under this condition, the seatback 3 can be pivoted to a desired angular position relative to the seat cushion 2.

When, upon the seatback 3 coming to the desired position, the grip 20c of the operation lever 20 is released from an operator's hand, the lever 20 is turned back to the above-mentioned original position due to the work of the biasing spring 24. Thus, the latched engagement between the lock lever 17 and the lock plate 14 is established. Thus, the seatback 3 is locked at the desired new angular position.

When, under this locked condition, due to for example sudden sitting of a person onto the seat 1, a big force is suddenly applied to the lock lever 17 in a direction to disengage the same from the lock plate portion 14, the disengaging movement, that is, the counterclockwise movement of the lock lever 17 is assuredly prevented because of the presence of the leading end of the first arm section 20a at the left side with respect to the imaginary line "a". That is, upon application of such big force, the bottom of the recess 17b of the lock lever 17 pushes the leading end of the first arm section 20a downwardly. However, because of the first arm section 20a being placed at the left side, the downward force applied to first arm section 20a induces a counterclockwise movement of the same about the pivot pin 21. This movement of the first arm section 20a induces the clockwise movement of the lock lever 17, that is, the movement for achieving the latched engagement between the lock lever 17 and the lock plate portion 14. In other words, an undesirable movement of the lock lever 17 in a direction to disengage from the lock plate portion 14 is changed to a desirable movement of the same after all.

As will be understood from the foregoing description, in the reclining device of the present invention, to assure the latched engagment between the lock lever and the lock plate portion even in a severe condition, it is possible to use as the spring 24 a relatively weak spring as compared with a spring employed in the conventional reclining device. Thus, manipulation of the handle (viz., the grip 20c of the operation lever 20) of the reclining device for cancelling the locked condition of the seatback can be easily achieved with a reduced force. This induces simple and low-cost production of the device.

Although the above description is directed to the illustrated embodiment, various modifications are available in the present invention. That is, if desired, the lock plate portion 14 may be a separate member which is secured to the hinge arm 12. Furthermore, if desired, a spiral spring may be used as a substitute for the spring 24, which is disposed about the pivot pin 21 to bias the operation lever 20 in a counterclockwise direction in the drawing.

What is claimed is:

1. A reclining device of a seat which has a seat cushion and a seatback, said reclining device comprising:
   a base member secured to said seat cushion;
   a hinge arm secured to said seatback and pivotally connected through a first pivot pin to said base member so that said seatback is pivotal relative to said seat cushion;
   a lock plate member movable with said hinge arm, said lock plate member being formed with a first toothed portion;
   a lock lever pivotally connected through a second pivot pin to said base member, said lock lever being formed with a second toothed portion which is latchingly engageable with said first toothed portion of the lock plate member when said lock lever assumes a given angular position;
   an operation lever pivotally connected through a third pivot pin to said base member for actuating said lock lever, said operation lever being pivotal between a first position to render said lock lever to achieve a latched engagement with said lock plate member through said first and second toothed portions and a second position to render said lock lever to cancel said latched engagement;
   first means for biasing said operation lever in a direction to bias said lock lever to achieve said latched engagement with said lock plate member;
   second means for urging said lock lever to keep the latched engagement between said lock lever and said lock plate member when, with said operation lever assuming said first position, an external force is applied to said lock lever in a direction to separate said lock lever from said lock plate member, said second means comprising a part of said lock lever, said part being formed with a recess which leaves at both sides thereof first and second lugs, and arm section integrally and non-movably formed on said operation lever, said arm section extending into said recess of the lock lever, wherein due to the work of said first means, said arm section is pressed against said first lug of said lock lever thereby to bias said lock lever in a direction to achieve the latched engagement with said lock plate member; and said hinge arm, said lock lever and said operation lever are so arranged that when said operation lever assumes said first position, said arm section of said operation lever is placed on an opposite side of said second pivot pin of the lock lever with respect to an imaginary line which passes through both said first pivot pin of the hinge lever and said third pivot pin of said operation lever and, when said operation lever assumes said second position, said arm section of said operation lever is placed on the same side as said second pivot pin with respect to said imaginary line.

2. A reclining device as claimed in claim 1, in which a top surface of said arm section of the operation lever is shaped to be concentric with said third pivot pin.

3. A reclining device as claimed in claim 2, in which said recess fo said lock lever has near said first lug a bottom which is shaped to coincide with the shape of said top surface of said arm section of the operation lever.

4. A reclining device as claimed in claim 3, in which said first toothed portion of said lock plate member comprises a plurality of teeth which are arranged to be concentric with said first pivot pin.

5. A reclining device as claimed in claim 4, in which said second toothed portion of said lock lever comprises a plurality of teeth which are arranged to coincide with the teeth of said lock plate member.

6. A reclining device as claimed in claim 1, in which said first means comprises a spring which is expanded between said operation lever and a given portion of said base member.

7. A reclining device as claimed in claim 6, in which said operation lever has a projected portion to which one end of said spring is hooked.

8. A reclining device as claimed in claim 1, further comprising third means for restricting the pivotal movement of said seatback.

9. A reclining means as claimed in claim 8, in which said third means comprises a projection formed on said hinge arm, and a stud provided on said base member, said projection being brought into contact with said stud when said seatback is pivoted in a given direction by a given angle.

* * * * *